US012773865B2

(12) United States Patent
Nakatani et al.

(10) Patent No.: US 12,773,865 B2
(45) Date of Patent: Oct. 27, 2026

(54) IMAGE PROCESSING APPARATUS, METHOD OF CONTROLLING THE SAME, AND STORAGE MEDIUM THAT DETECT AN IMAGE DEFECT CORRESPONDING TO EACH COLOR INCLUDED IN A SCANNED IMAGE

(71) Applicant: CANON KABUSHIKI KAISHA, Tokyo (JP)

(72) Inventors: Yuki Nakatani, Chiba (JP); Shinya Suzuki, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 130 days.

(21) Appl. No.: 18/439,907

(22) Filed: Feb. 13, 2024

(65) Prior Publication Data

US 2024/0286421 A1 Aug. 29, 2024

(30) Foreign Application Priority Data

Feb. 24, 2023 (JP) ................................. 2023-027513

(51) Int. Cl.
*B41J 29/393* (2006.01)
*G06K 15/02* (2006.01)
(Continued)

(52) U.S. Cl.
CPC .......... *B41J 29/393* (2013.01); *G06K 15/027* (2013.01); *G06T 7/0002* (2013.01); *G06V 10/40* (2022.01);
(Continued)

(58) Field of Classification Search
CPC ............ B41J 29/393; B41J 2029/3935; G06K 15/027; G06T 7/0002; G06T 2207/30144; G06V 10/40; G03G 15/5062; H04N 1/00023; H04N 1/00074; H04N 1/00084; H04N 1/00029; H04N 1/00034; H04N 1/00045; H04N 1/00015; H04N 1/00018;
(Continued)

(56) References Cited

U.S. PATENT DOCUMENTS

2015/0331640 A1 11/2015 Masanori
2019/0041785 A1 2/2019 Hiroshi
2019/0281171 A1 9/2019 Koji

FOREIGN PATENT DOCUMENTS

JP 2019133020 A 8/2019

OTHER PUBLICATIONS

Extended European Search Report issued Jun. 26, 2024, in corresponding European Patent Application No. 24154632.4 (11 pages).
(Continued)

*Primary Examiner* — Jannelle M Lebron
(74) *Attorney, Agent, or Firm* — Venable LLP

(57) ABSTRACT

An image processing apparatus includes one or more controllers including one or more processors and one or more memories. The one or more controllers are configured to obtain a scanned image by scanning an image of a chart on which a test image of mixed colors, which are a secondary or higher-order colors, has been printed, to detect an image defect corresponding to each color included in the scanned image, to obtain a feature of the detected image defect, and to identify a cause of an occurrence of the image defect by determining whether there are identical image defects in image defects corresponding to all colors of the test image, based on the feature.

13 Claims, 12 Drawing Sheets

(51) Int. Cl.
*G06T 7/00* (2017.01)
*G06V 10/40* (2022.01)

(52) U.S. Cl.
CPC .................. *B41J 2029/3935* (2013.01); *G06T 2207/30144* (2013.01)

(58) Field of Classification Search
CPC ........... H04N 1/00005; H04N 1/00039; H04N 1/00031; H04N 1/00037
See application file for complete search history.

(56) References Cited

OTHER PUBLICATIONS

Korean Office Action issued May 18, 2026, in corresponding Korean Patent Application No. 10-2024-0025585, with English translation (16 pages).

SINGLE COLOR CHART

MIXED -COLOR CHART

BLANK CHART

IMAGE PROCESSING APPARATUS, METHOD OF CONTROLLING THE SAME, AND STORAGE MEDIUM THAT DETECT AN IMAGE DEFECT CORRESPONDING TO EACH COLOR INCLUDED IN A SCANNED IMAGE

CROSS-REFERENCE TO PRIORITY APPLICATION

This application claims the benefit of Japanese Patent Application No. 2023-027513, filed Feb. 24, 2023, which is hereby incorporated by reference herein in its entirety.

BACKGROUND OF THE INVENTION

Field of the Invention

The present invention relates to an image processing apparatus, a method of controlling the same, and a storage medium.

Description of the Related Art

There are image diagnosis techniques for diagnosing the cause of occurrence of an image defect in an image forming apparatus. Japanese Patent Laid-Open No. 2019-133020 describes an image diagnosis technique in which a first chart and a second chart are used. The first chart is a chart printed in single-sided printing mode where a pattern is printed only on a first side of a printing medium and a back side thereof is a non-printed side. The second chart is a chart printed in double-sided printing mode where a pattern is printed on one side of a printing medium different from that of the printing medium of the first chart and a white image is printed on a back side thereof. Scanned images (for which images of the printing media on which the first and second charts have been printed respectively has been scanned) are obtained, and a side to be used for diagnosis is determined and diagnosis is performed according to image diagnosis items, based on the scanned images. It is described that thus printing media (materials) and time are saved and image diagnosis is appropriately performed.

In image diagnosis techniques, it is necessary to perform more accurate image diagnosis, and so, it is necessary to accurately identify the cause of an image defect that occurred. For example, white dropout image defects of similar shapes occur in a developing unit of an image forming station, which performs image formation using a photosensitive drum, and a secondary transfer unit, which transfers toner images to a printing medium from an intermediate transfer belt. The white dropout image defects that occur due to a developing unit occur only in the image area corresponding to a color of toner stored in that developing device. The white dropout image defects that occur due to the secondary transfer unit occur in the image area corresponding to all colors of toners, and so, in a multinary color image area in which toners of a plurality of colors have been overlapped, for example, the toners of a plurality of colors will dropout and the area will be white due to a transfer failure.

However, in a case when a white dropout image defect occurs in a test chart composed of single-color patches, such as that described in Japanese Patent Laid-Open No. 2019-133020, it is difficult to distinguish whether the image defect occurred in a developing unit for performing development with the toner forming the single-color patch or the secondary transfer unit, which could cause the image defect in each of the single-color patch areas.

SUMMARY OF THE INVENTION

Embodiments of the present disclosure eliminate the above-mentioned issues with conventional technology.

A feature of embodiments of the present disclosure is to provide a technique for allowing easy identification of the cause of occurrence of an image defect that occurs in a printed test image.

According to embodiments of the present disclosure, an image processing apparatus comprises one or more controllers including one or more processors and one or more memories, the one or more controllers configured to obtain a scanned image by scanning an image of a chart on which a test image has been printed, to detect an image defect included in the scanned image, to obtain a feature of the detected image defect, and to identify a cause of occurrence of the image defect based on the feature, wherein the test image includes at least one mixed-color image of multinary colors, which are a secondary or higher-order color.

According to embodiments of the present disclosure, an image processing apparatus comprises one or more controllers including one or more processors and one or more memories, the one or more controllers configured to obtain a scanned image by scanning an image of a chart on which a test image of multinary colors, which are a secondary or higher-order color, has been printed, to detect an image defect corresponding to a respective color included in the scanned images, obtain a feature of the detected image defect, and to identify a cause of occurrence of the image defect based on the feature.

According to embodiments of the present disclosure, a method of controlling an image processing apparatus, the method comprising obtaining a scanned image by scanning an image of a chart on which a test image has been printed, detecting an image defect included in the scanned image, obtaining a feature of the detected image defect, and identifying a cause of occurrence of the image defect based on the feature, wherein the test image includes at least one mixed-color image of multinary colors, which are a secondary or higher-order color.

According to embodiments of the present disclosure, a method of controlling an image processing apparatus, the method comprising obtaining a scanned image by scanning an image of a chart on which a test image of multinary colors, which are a secondary or higher-order color, has been printed, detecting an image defect corresponding to a respective color included in the scanned image, obtaining a feature of the detected image defect, and identifying a cause of occurrence of the image defect based on the feature.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

DESCRIPTION OF THE EMBODIMENTS

Figure 1:
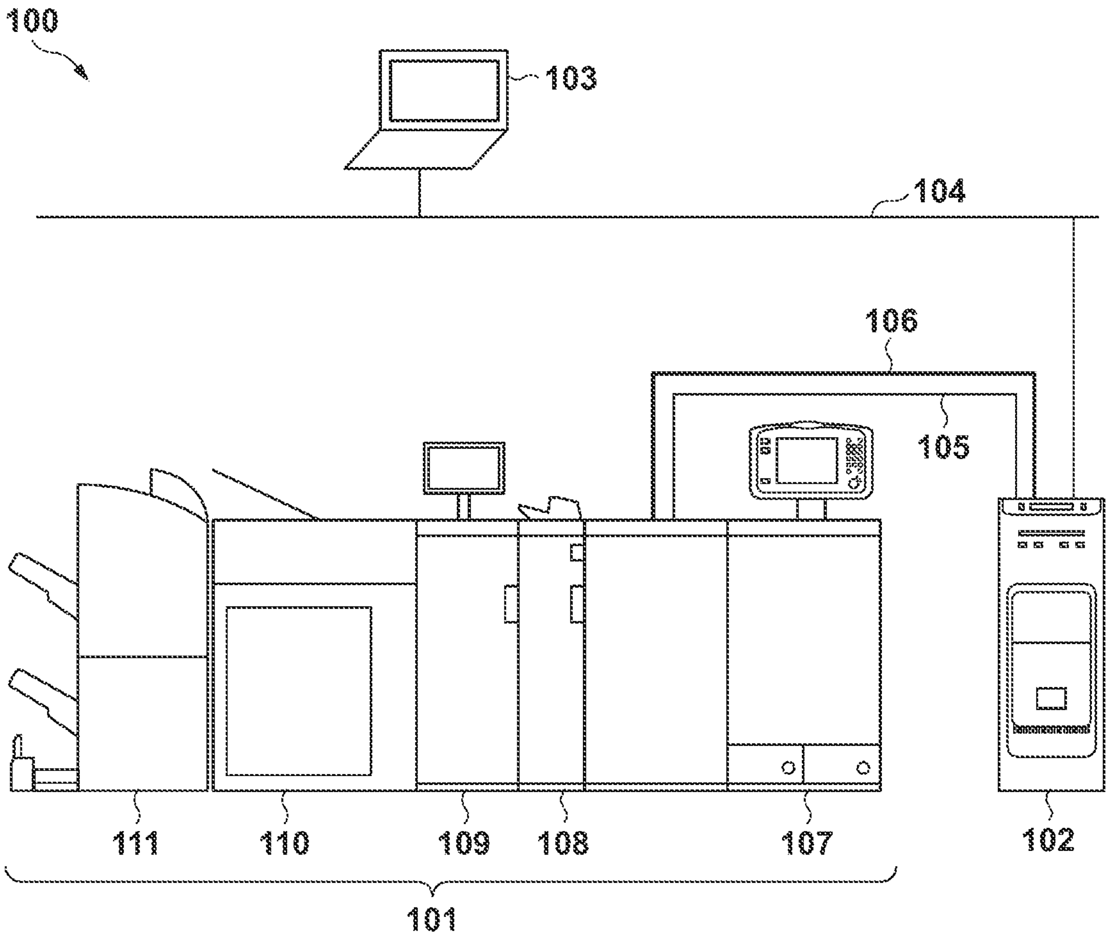
FIG. 1 is a diagram illustrating an example of a network configuration that includes a printing system (image processing system) according to a first embodiment of the present invention.

Embodiments of the present disclosure will be described hereafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure. Further, in the accompanying drawings, the same or similar configurations are assigned the same reference numerals, and redundant descriptions are omitted.

In the following description, an external controller may be referred to as an image processing controller, a digital front end (DFE), a print server, and the like. An image forming apparatus may be referred to as a multi-function peripheral (the MFP).

First Embodiment

FIG. 1 is a diagram illustrating an example of a network configuration that includes a printing system (image processing system) according to a first embodiment of the present invention.

A printing system 100 includes an image forming apparatus 101 and an external controller 102. The image forming apparatus 101 and the external controller 102 are connected via an internal LAN 105 and a video cable 106 so as to be capable of communication. The external controller 102 is connected with a client PC 103 via an external LAN 104 so as to be capable of communication.

The client PC 103 can issue print instructions to the external controller 102 via the external LAN 104. A printer driver that has a function of converting print processing target image data into a page description language (PDL) that can be processed by the external controller 102 is installed on the client PC 103. By operating the client PC 103, a user who wants to perform printing can issue a print instruction via the printer driver from various kinds of applications installed on the client PC 103. The printer driver transmits PDL data, which is print data, to the external controller 102 based on the print instruction from the user. Upon receiving the PDL data from the client PC 103, the external controller 102 analyzes and interprets the received PDL data. Then, rasterization processing is performed based on the interpretation results to generate a bitmap image (print image data) whose resolution matches that of the image forming apparatus 101, and a print instruction is issued by input of a print job to the image forming apparatus 101. In many cases, the resolution of the image forming apparatus is 600 dpi at normal and 1300 dpi at high definition. Descriptions will be given below using examples in which the resolution is 600 dpi.

Next, the image forming apparatus 101 will be described. In the image forming apparatus 101, a plurality of apparatuses having different functions are connected, and a configuration is taken so as to allow complicated printing processing, including such as bookbinding. The image forming apparatus 101 includes a printing apparatus 107, an inserter 108, an inspection apparatus 109, a stacker 110, and a finisher 111. Each device will be described below.

The printing apparatus 107 prints an image according to a print job and discharges the printed recording material. The printed recording material discharged from the printing apparatus 107 is conveyed within each apparatus in the order of the inserter 108, the inspection apparatus 109, the stacker 110, and the finisher 111. In the first embodiment, the image forming apparatus 101 of the printing system 100 is an example of the image forming apparatus. However, in some cases, the printing apparatus 107 included in the image forming apparatus 101 is referred to as the image forming apparatus.

The printing apparatus 107 uses toner (developer) to form (print) an image on a recording material fed and conveyed from a paper feeding unit disposed in a lower portion of the printing apparatus 107. The inserter 108 is an apparatus for inserting an interleave recording material, or the like, into a series of recording materials conveyed from the printing apparatus 107 to separate them at a desired position, for example. The inspection apparatus (image processing apparatus) 109 is an apparatus for inspecting a printing defect (image defect) of a printed recording material conveyed through a conveyance path after an image has been printed by the printing apparatus 107. Specifically, the inspection apparatus 109 scans an image printed on a conveyed printed recording material and compares the obtained scanned image with a pre-registered reference image to determine whether or not the image printed on the printed recording material is normal, thereby inspecting whether there is an image defect. The image defect includes a dot or streak-like defect, irregularity, and the like, for example. The stacker 110 is an apparatus capable of stacking a large number of printed recording materials. The finisher 111 is an apparatus capable of performing finishing processing, such as stapling processing, punching processing, and saddle stitching processing on conveyed printed recording materials. The recording materials processed by the finisher 111 are discharged to a predetermined discharge tray.

In the configuration example of FIG. 1, the external controller 102 is connected to the image forming apparatus 101. However, the present embodiment is also applicable to a configuration different from this. For example, a configuration in which the image forming apparatus 101 is connected to the external LAN 104 and print data is transmitted from the client PC 103 to the image forming apparatus 101 without being passed through the external controller 102 may be used. In such a case, data analysis and rasterization for print data are performed by the image forming apparatus 101.

Figure 2:
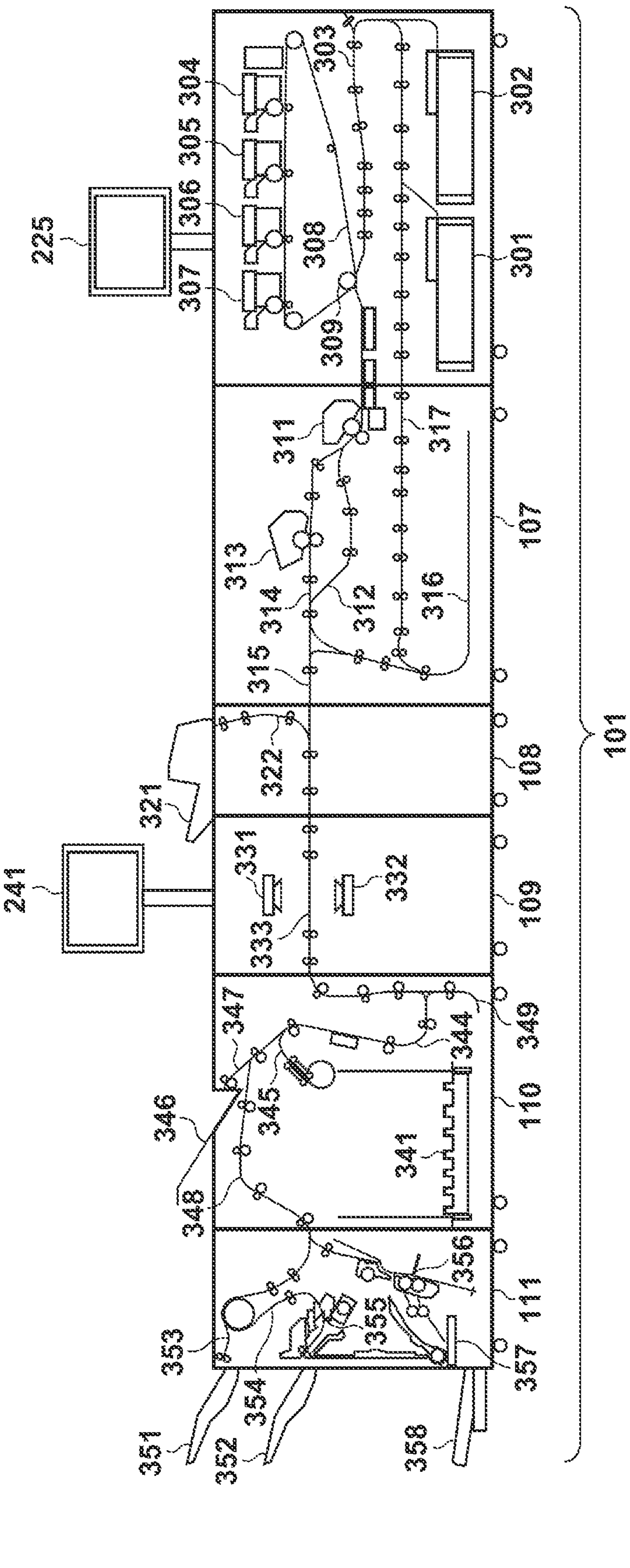
FIG. 2 depicts a cross-sectional view illustrating an example of a hardware configuration of an image forming apparatus according to the first embodiment.

FIG. 2 depicts a cross-sectional view illustrating an example of a hardware configuration of the image forming apparatus 101 according to the first embodiment. A specific operation example of the image forming apparatus 101 will be described below with reference to FIG. 2.

In the printing apparatus 107, various kinds of recording materials are stored in paper feed decks 301 and 302. Among recording materials stored in a respective paper feed deck, a recording material at the uppermost position is separated and fed to a conveyance path 303 one sheet at a time. Image forming stations 304 to 307 each includes a photosensitive drum (photosensitive body) and each use toner of a different color to form a toner image on the photosensitive drum. Specifically, the image forming stations 304 to 307 form toner images using yellow (Y), magenta (M), cyan (C), and black (K) toners, respectively.

The toner images of respective colors formed in the image forming stations 304 to 307 are sequentially transferred onto an intermediate transfer belt 308 in a superimposed manner (primary transfer). The toner images transferred to the intermediate transfer belt 308 are conveyed to a secondary transfer position 309 according to the rotation of the intermediate transfer belt 308. At the secondary transfer position 309, the toner images are transferred from the intermediate transfer belt 308 to a recording material conveyed through the conveyance path 303 (secondary transfer). The post-secondary transfer recording material is conveyed to a fixing unit 311. The fixing unit 311 includes a pressing roller and a heating roller. Fixing processing for fixing the toner images on the recording material is performed by application of heat and pressure to the recording material while the recording material is passing between the rollers. The recording material that passed the fixing unit 311 passes a conveyance path 312 and is conveyed to a connection point 315 between the printing apparatus 107 and the inserter. A color image is thus formed (printed) on the recording material.

When further fixing processing is necessary according to the type of the recording material, the recording material that has passed through the fixing unit 311 is guided to a conveyance path 314 in which a fixing unit 313 is disposed. The fixing unit 313 performs further fixing processing on the recording material conveyed through the conveyance path 314. The recording material that has passed through the fixing unit 313 is conveyed to the connection point 315. When the operation mode in which double-sided printing is performed is set, the recording material on which an image has been printed on a first surface and that has been conveyed through the conveyance path 312 or the conveyance path 314 is guided to a reversing path 316. The recording material reversed in the reversing path 316 is guided to a double-sided conveyance path 317 and conveyed to the secondary transfer position 309. The toner images are thus transferred to a second surface opposite to the first surface of the recording material at the secondary transfer position 309. By the recording material then passing through the fixing unit 311 (and the fixing unit 313), formation of the color image on the second surface of the recording material is completed.

The printed recording material for which formation (printing) of an image in the printing apparatus 107 has been completed and that has been conveyed to the connection point 315 is conveyed into the inserter 108. The inserter 108 includes an inserter tray 321 on which recording materials to be inserted are set. The inserter 108 performs processing in which a recording material fed from the inserter tray 321 is inserted into a desired insertion position in a series of printed recording materials conveyed from the printing apparatus 107 and the recording materials are conveyed to the subsequent apparatus (inspection apparatus 109). The printed recording materials that have passed through the inserter 108 are sequentially conveyed to the inspection apparatus 109.

The inspection apparatus 109 includes image readers 331 and 332, each having a contact image sensor (CIS), over and under a conveyance path 333 through which the printed recording materials are conveyed from the inserter 108. The image readers 331 and 332 are disposed at positions facing each other across the conveyance path 333. The image readers 331 and 332 are configured to read the upper surface (first surface) and the lower surface (second surface) of the recording material, respectively. The image readers may be configured by, for example, charge coupled devices (CCDs) or line scan cameras instead of the CISs.

The inspection apparatus 109 performs inspection processing for inspecting an image printed on a printed recording material conveyed through the conveyance path 333. Specifically, the inspection apparatus 109 uses the image readers 331 and 332 to perform reading processing for reading images of the printed recording material at a timing at which the printed recording material being conveyed reaches a predetermined position. Further, the inspection apparatus 109 inspects the image printed on the recording material based on the image obtained by the reading processing. The recording materials that have passed through the inspection apparatus 109 are sequentially conveyed to the stacker 110.

In the first embodiment, the inspection apparatus 109 performs inspection processing for identifying an image defect by comparing a scanned image obtained by scanning an image printed on a printed recording material with a pre-registered reference image. As a method of comparing images in the inspection processing, for example, there are a method of comparing pixel values for each pixel and a method of comparing positions of objects obtained by edge detection. There also is a method in which character data extraction by optical character recognition (OCR) is used.

The inspection apparatus 109 performs inspection processing for preset inspection items. The inspection items include, for example, a shift in the printing position of an image, color tone of an image, density of an image, streaks or fading occurred in an image, and print dropout.

The stacker 110 includes a stack tray 341 as a tray on which printed recording materials conveyed from the inspection apparatus 109, which is disposed upstream in the conveyance direction of printed recording materials, are stacked. The printed recording materials that have passed through the inspection apparatus 109 are conveyed through a conveyance path 344 in the stacker 110. The printed recording materials conveyed through the conveyance path 344 are stacked on the stack tray 341 by being guided to a conveyance path 345.

The stacker 110 further includes an escape tray 346 as a discharge tray. In the first embodiment, the escape tray 346 is used to discharge printed recording materials determined to have an image defect in the printed image based on a result of inspection by the inspection apparatus 109. The printed recording materials conveyed through the conveyance path 344 are conveyed to the escape tray 346 by being guided to a conveyance path 347. The printed recording materials that have been conveyed without being stacked on the stack tray 341 or discharged to the escape tray 346 in the stacker 110, are conveyed to the subsequent finisher 111 through a conveyance path 348.

The stacker 110 further includes a reversing unit 349 for reversing the direction of conveyed printed recording materials. The reversing unit 349 is used, for example, to align the orientation of the printed recording material when it is stacked on the stack tray 341 and outputted from the stacker 110 with the orientation of the recording material when it is inputted to the stacker 110. The reversing operation by the reversing unit 349 is not performed for printed recording materials not stacked in the stacker 110 and conveyed to the finisher 111.

The finisher 111 executes a finishing function specified by the user on printed recording materials conveyed from the inspection apparatus 109, which is disposed upstream in the conveyance direction of printed recording materials. In the first embodiment, the finisher 111 includes finishing functions, such as, for example, a stapling function (one-point or two-point stapling), a punching function (two holes or three holes), and a saddle stitching function. The finisher 111 includes two output trays 351 and 352. When the finishing processing by the finisher 111 is not performed, the printed recording material conveyed to the finisher 111 is discharged to the discharge tray 351 through a conveyance path 353. When the finishing processing, such as the stapling processing, is to be performed by the finisher 111, the printed recording material conveyed to the finisher 111 is guided to a conveyance path 354. The finisher 111 executes the finishing processing specified by the user on the printed recording materials conveyed through the conveyance path 354 using a processing unit 355 and discharges the printed recording material on which the finishing processing has been executed to the discharge tray 352. If saddle stitching is specified, sheets are folded in two after being stapled in the middle of the sheet in a saddle stitching processing unit 356 and are outputted to a saddle stitch binding tray 358 via a sheet conveyance path 357. The saddle stitch binding tray 358 is in a conveyor-belt configuration and is configured to convey a saddle stitched bundle stacked on the saddle stitch binding tray 358 to the left.

Figure 3:
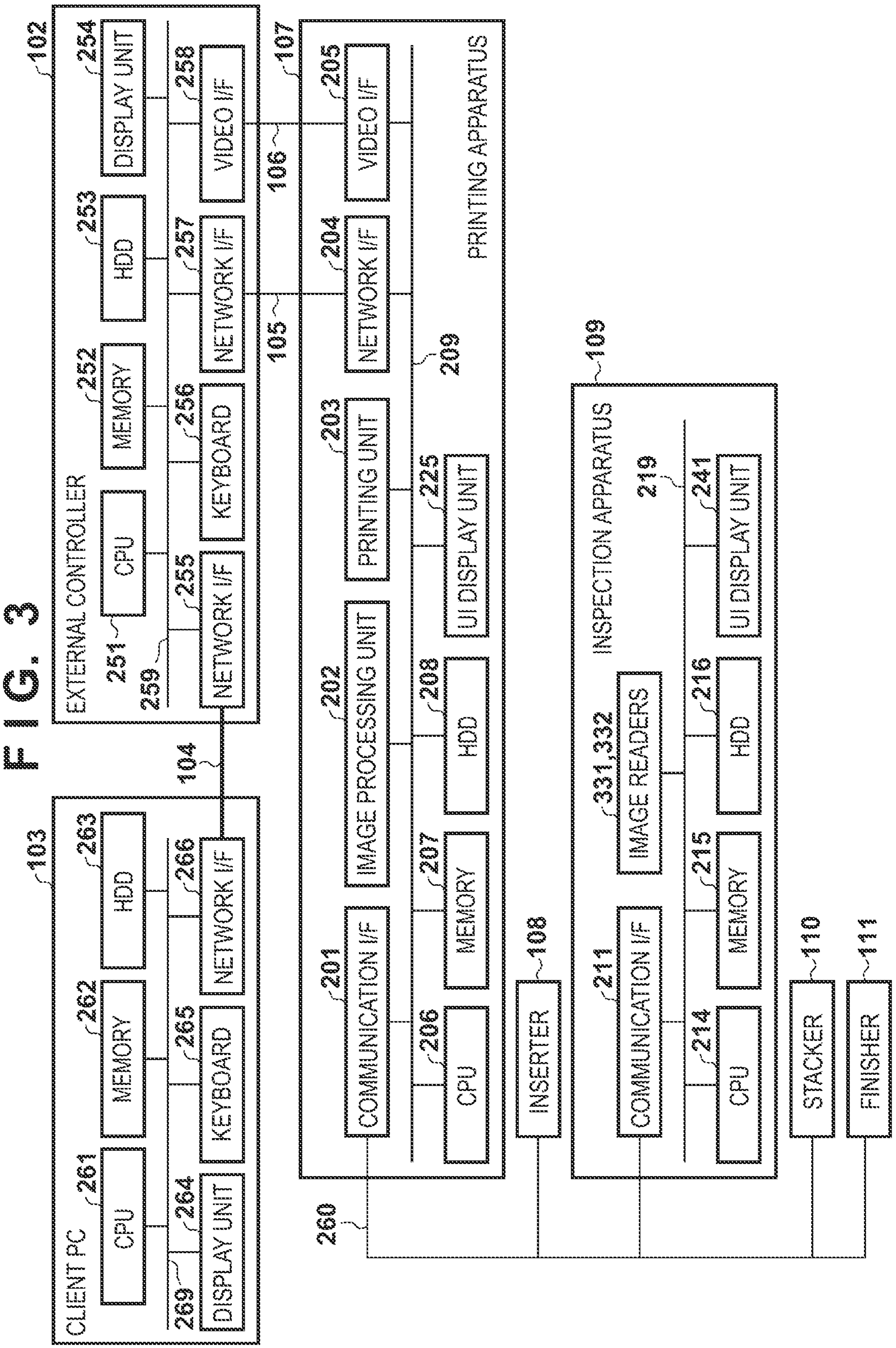
FIG. 3 is a block diagram for describing a schematic functional configuration of the image forming apparatus, an external controller, and a client PC according to the first embodiment.

FIG. 3 is a block diagram for describing a schematic functional configuration of the image forming apparatus 101, the external controller 102, and the client PC 103 according to the first embodiment.

The printing apparatus 107 of the image forming apparatus 101 includes a communication I/F (interface) 201, a network I/F 204, a video I/F 205, a CPU 206, a memory 207, an HDD 208, and a UI display unit 225. The printing apparatus 107 further includes an image processing unit 202 and a printing unit 203. These are each connected to be capable of transmitting and receiving data to and from each other via a system bus 209.

The communication I/F 201 is connected to the inserter 108, the inspection apparatus 109, the stacker 110, and the finisher 111 through a communication cable 260. The CPU 206 performs communication for control of each apparatus via the communication I/F 201. The network I/F 204 is connected to the external controller 102 via the internal LAN 105 and is used for communication of control data, and the like. The video I/F 205 is connected to the external controller 102 via the video cable 106 and is used for communication of data, such as image data. The printing apparatus 107 (image forming apparatus 101) and the external controller 102 may be connected only by the video cable 106 as long as the operation of the image forming apparatus 101 can be controlled by the external controller 102.

The HDD 208 stores various kinds of programs and data. The CPU 206 controls the operation of the entire printing apparatus 107 by deploying the programs stored in the HDD 208 in the memory 207 and executing the program. The memory 207 stores programs and data necessary for when the CPU 206 performs various kinds of processing. The memory 207 operates as a work area of the CPU 206. The UI display unit 225 receives input of various kinds of settings and operation instructions from the user and is used to display various kinds of information, such as setting information and print job processing status.

The inserter 108 controls insertion of recording materials fed from the paper feeding unit and conveyance of recording materials conveyed from the printing apparatus 107.

The inspection apparatus 109 includes a communication I/F 211, a CPU 214, a memory 215, an HDD 216, the image readers 331 and 332, and a UI display unit 241. These devices are connected to be capable of transmitting and receiving data to and from each other via a system bus 219. The communication I/F 211 is connected to the printing apparatus 107 via the communication cable 260. The CPU 214 performs communication necessary for control of the inspection apparatus 109 via the communication I/F 211. The CPU 214 controls the operation of the inspection apparatus 109 by executing a control program stored in the memory 215. The control program for the inspection apparatus 109 is stored in the memory 215.

The image readers 331 and 332 read images of a conveyed recording material according to an instruction of the CPU 214. The CPU 214 performs processing for storing images obtained by scanning images with the image readers 331 and 332 in the HDD 216 as inspection reference images. Further, the CPU 214 compares the inspection images read by the image readers 331 and 332 with inspection reference images stored in the HDD 216 and, based on that comparison result, performs inspection processing for inspecting an image printed on the recording material. Although an example in which images scanned by the image readers 331 and 332 are used as inspection reference images has been described, the present invention is not limited thereto. For example, a bitmap image for which PDL data has been rasterized may be stored in the HDD 216 as an inspection reference image and used for defect inspection processing.

The UI display unit 241 is used to display an inspection result, a setting screen, and the like. An operation unit is also used as the UI display unit 241, is operated by the user, and accepts various instructions from the user, such as a setting change of the inspection apparatus 109, an instruction for registering the inspection reference image, and an instruction for executing image diagnosis, for example. The HDD 216 stores various kinds of setting information necessary for defect inspection and image data. The various kinds of setting information and image data stored in the HDD 216 can be reused.

The stacker 110 performs control as to whether to discharge a printed recording material conveyed through the conveyance path to the stack tray or the escape tray 346 or to convey the printed recording material to the finisher 111 connected downstream in the conveyance direction.

The finisher 111 controls conveyance and discharge of a printed recording material and performs finishing processing, such as stapling, punching, or saddle stitching.

The external controller 102 includes a CPU 251, a memory 252, an HDD 253, a keyboard 256, a display unit 254, network I/Fs 255 and 257, and a video I/F 258. These devices are connected to be capable of transmitting and receiving data to and from each other via a system bus 259. The CPU 251 control the operation of the entire external controller 102, such as reception of print data from the client PC 103, RIP processing, and transmission of print data to the image forming apparatus 101, by executing a program stored in the HDD 253. The memory 252 stores programs and data necessary for when the CPU 251 performs various kinds of processing. The memory 252 operates as a work area of the CPU 251.

The HDD 253 stores various kinds of programs and data. The keyboard 256 is used for a user to input operation instructions to the external controller 102. The display unit 254 is, for example, a display and is used to display information on an application being executed in the external controller 102 and an operation screen. The network I/F 255 is connected to the client PC 103 via the external LAN 104 and is used for communication of data, such as print instructions. The network I/F 257 is connected to the image forming apparatus 101 via the internal LAN 105 and is used for communication of data, such as print instructions. The external controller 102 is configured so as to be capable of communicating with the printing apparatus 107, the inserter 108, the inspection apparatus 109, the stacker 110, and the finisher 111 via the internal LAN 105 and the communication cable 260. The video I/F 258 is connected to the image forming apparatus 101 via the video cable 106 and is used for communication of data, such as image data (print data).

The client PC 103 includes a CPU 261, a memory 262, an HDD 263, a display unit 264, a keyboard 265, and a network I/F 266. These devices are connected to be capable of transmitting and receiving data to and from each other via a system bus 269. The CPU 261 controls the operation of each device via the system bus 269 by deploying a program stored in the HDD 263 in the memory 262 and executes the program. Various kinds of processing by the client PC 103 are thus realized. For example, the CPU 261 executes a document processing program stored in the HDD 263 to issue a print data generation and print instruction. The memory 262 stores programs and data necessary for when the CPU 261 performs various kinds of processing. The memory 262 operates as a work area of the CPU 261.

The HDD 263 stores, for example, various kinds of applications (e.g., the document processing program) and programs (e.g., the printer driver) and various kinds of data. The display unit 264 is, for example, a display and is used to display information on an application being executed in the client PC 103 and an operation screen. The keyboard 265 is used for a user to input operation instructions to the client PC 103. The network I/F 266 is connected to the external controller 102 via the external LAN 104 so as to be capable of communication. The CPU 261 communicates with the external controller 102 via the network I/F 266.

A configuration in which the image forming apparatus 101 is connected to the external LAN 104 and print data is transmitted from the client PC 103 to the image forming apparatus 101 without being passed through the external controller 102 may be used. In such a case, data analysis and interpretation and rasterization for print data are performed by the image forming apparatus 101.

Next, image diagnosis processing according to the first embodiment will be described with reference to the drawings.

Figure 4:
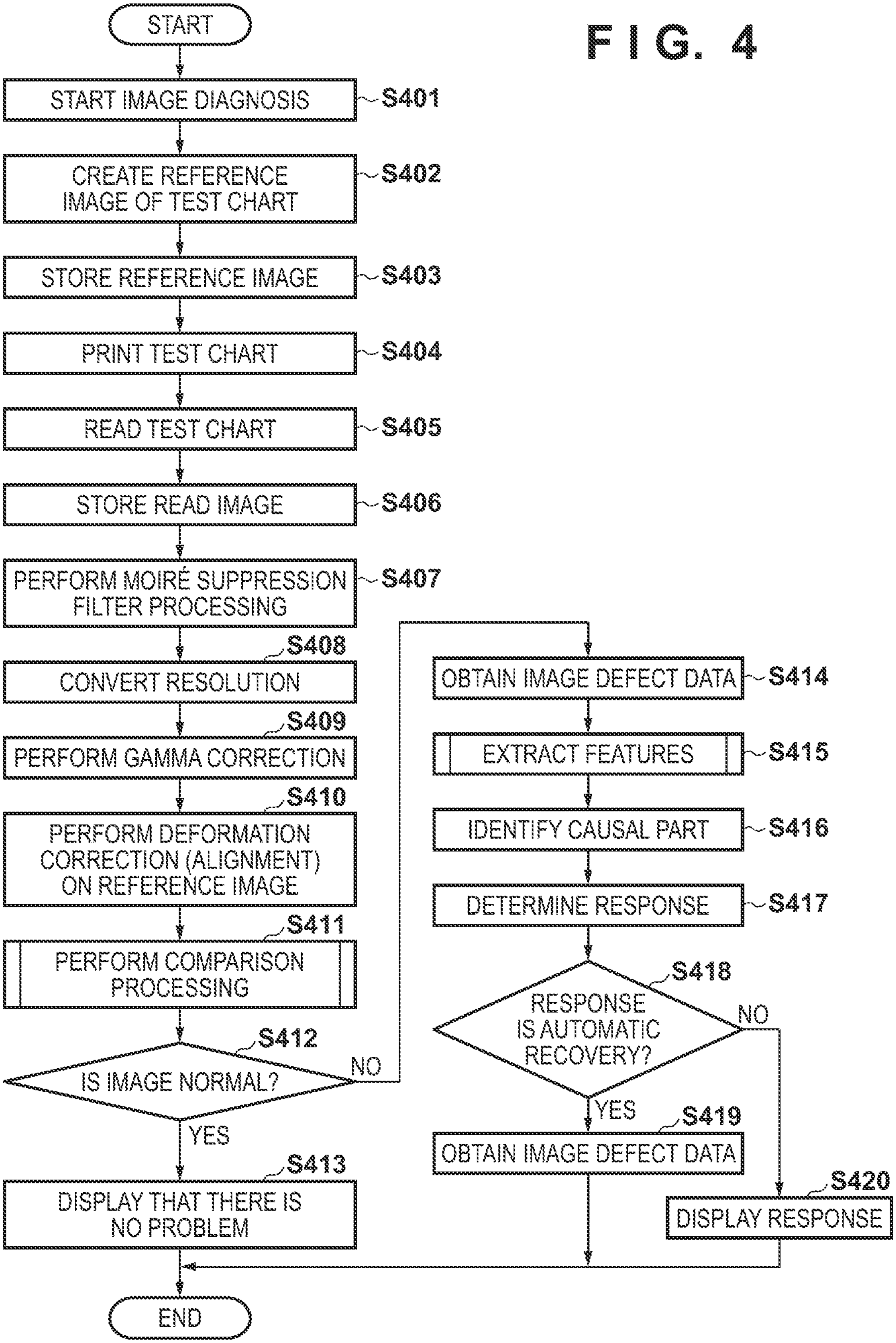
FIG. 4 is a flowchart for explaining a procedure of image diagnosis processing in the printing system according to the first embodiment.

FIG. 4 is a flowchart for explaining a procedure of image diagnosis processing in the printing system according to the first embodiment. For the purpose of simplifying the description, we will describe an example of image diagnosis processing using only the image reader 331.

First, in step S401, upon accepting an image diagnosis instruction from a user or a service worker via the UI display unit 241 of the inspection apparatus 109, which also serves as the operation unit, the printing system 100 starts the image diagnosis processing. In step S402, the CPU 251 of the external controller 102 reads a pre-stored test chart, rasterizes the test chart into a bitmap, and creates a reference image based on the rasterized bitmap of the test chart. The test chart is an image (hereafter, also referred to as a test image) for failure diagnosis of the image forming apparatus 101. Next, the processing proceeds to step S403, and the CPU 251 temporarily stores the reference image of the test chart created in step S402 in the HDD 253 of the external controller 102. Then, the reference image of the test chart stored in the HDD 253 is transmitted to the inspection apparatus 109 and stored in the HDD 216 of the inspection apparatus 109. Descriptions will be given below assuming that the resolution of the reference image of the test chart is 600 dpi.

Next, the processing proceeds to step S404, and the CPU 251 transmits the rasterized bitmap data of the test chart from the video I/F 258 to the video I/F 205 of the printing apparatus 107 via the video cable 106. Thus, the CPU 206 of the printing apparatus 107 performs halftoning processing on the bitmap data of the test chart received via the video I/F 205 and prints the test chart in the printing unit 203 based on the halftone processed image data.

Next, the processing proceeds to step S405, the CPU 214 of the inspection apparatus 109 performs processing in which the image reader 331 scans the test chart printed in the printing apparatus 107. Next, the processing proceeds to step S406, and the CPU 214 stores the scanned image of the test chart obtained by the scanning in step S405 in the HDD 216 of the inspection apparatus 109 as an inspection image. Here, the scanned image is stored as a color image that has three channels, R, G, and B. In the first embodiment, descriptions will be given below assuming that the resolution for when the image reader 331 scans the test chart is 600 dpi.

Next, the processing proceeds to step S407, and the CPU 214 executes filter processing for suppressing occurrence of moiré on the scanned image of the printed matter (test chart) obtained by the scanning in step S405. Next, the processing proceeds to step S408, and the CPU 214 performs resolution conversion processing on the filter processed scanned image of the printed matter (test chart). The resolution of the filter processed scanned image is thus converted into 300 dpi. Then, the processing proceeds to step S409, and the CPU 214 executes gamma correction processing according to a look-up table stored in the memory 215 of the inspection apparatus 109 so as to match the tone of the reference image created in step S402 and the tone of the scanned image converted in step S408.

Next, the processing proceeds to step S410, and the CPU 214 corrects the deformation of the reference image and aligns the scanned image and the reference image for which deformation has been corrected in step S410. Next, the processing proceeds to step S411, and the CPU 214 performs the processing for comparing the reference image and the scanned image of the test chart for which conditions, such as resolution, have been aligned. The comparison processing of step S411 will be described later with reference to the flowchart of FIG. 7. When the scanned image and reference image comparison processing is thus completed, the processing proceeds to step S412, and the CPU 214 determines whether the printed image (test chart image) is normal based on the result of comparison of the reference image and the scanned image according to the comparison processing. Here, if a determination result that the printed image is normal is obtained, the processing proceeds to step S413. In step S413, the CPU 214 displays the image diagnosis result indicating that there is no problem in the UI display unit 241 of the inspection apparatus 109. For example, "no problem" is displayed, and the processing is ended.

Meanwhile, if a determination result that the printed image is abnormal (there is a defect in the image) is obtained in step S412, the processing proceeds to step S414. In step S414, the CPU 214 obtains image defect data obtained by performing the reference image and scanned image comparison processing in step S411. Next, the processing proceeds to step S415, and the CPU 214 extracts image defect features from the image defect data. Image defect feature information obtained by the extraction processing includes, for example, color information as to whether it is a single color (yellow, magenta, cyan, or black) or multinary colors generated by a plurality of colors, contrast information indicating the density of the image defect, shape information (e.g., size and whether it is vertically long), and the like. Further, there are coordinate information indicating a vertical position in a conveyance direction of the test chart in the printing apparatus 107, periodicity information indicating that defects of similar features are occurring periodically in a conveyance direction of the test chart of the printing apparatus 107, and the like.

Next, the processing proceeds to step S416, the CPU 214 identifies the part that caused the image defect in the printing apparatus 107 and the inspection apparatus 109 based on the image defect feature information obtained in step S415. Then, the processing proceeds to step S417, and the CPU 214 determines a response (countermeasure) to the image defect based on the causal part identified in step S416. Responses can be divided into responses for which automatic recovery is possible and responses for which automatic recovery is not possible. The responses for which automatic recovery is possible include, for example, responses for which automatic recovery is possible in the printing apparatus 107, such as the cleaning of a wire or a grid of a corona charger, which is a charging unit of the photosensitive drum provided in the image forming stations 304 to 307 of the printing apparatus 107. The responses for which automatic recovery is not possible include, for example, responses that need the work of the user, such as cleaning of dirt of reading surfaces of image readers 331 and 332 of the inspection apparatus 109 and adjustment of a recording material to be used), and responses that need the work of a service worker, such as exchange of a part. Further, the responses for which automatic recovery is not possible include, for example, responses for fibers, foreign substances, and the like that are in the recording material from before execution of image formation.

Next, the processing proceeds to step S418, and the CPU 214 determines whether the response determined in step S417 is a response for which automatic recovery is possible. If it is determined in step S418 that the response is a response for which automatic recovery is possible, the processing proceeds to step S419. In step S419, the CPU 214 performs automatic recovery control corresponding to the cause of the image defect. Meanwhile, if it is determined in step S418 that the response is not a response for which automatic recovery is possible, the processing proceeds to step S420. In step S420, the CPU 214 displays the image diagnosis results and the response method on the UI display unit 241 of the inspection apparatus 109. When any of the processes of the above-described step S413, step S419, step S420 is completed, the flowchart (image diagnosis processing) illustrated in FIG. 4 is ended.

With the above-described processing, if an image defect is detected in a scanned image, the features thereof, such as color information as to whether it is a single color or multinary colors generated by a plurality of colors, contrast information indicating the density of the image defect, shape information (e.g., size and whether it is vertically long), and periodicity information, are obtained. Then, a part that is the cause of the image defect in the printing apparatus or the inspection apparatus can be identified based on the features.

Figure 5A:
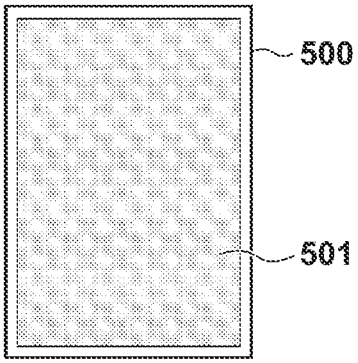
FIGS. 5A and 5B are diagrams illustrating an example of a test chart to be used in the image diagnosis processing according to the first embodiment.
Figure 5B:
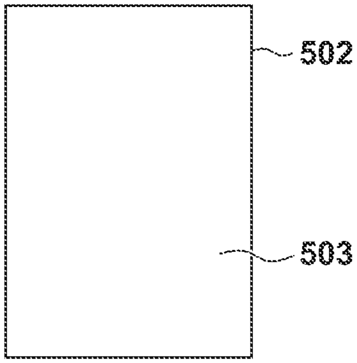

FIGS. 5A and 5B are diagrams illustrating an example of a test chart to be used in the image diagnosis processing according to the first embodiment.

A test chart 500 illustrated in FIG. 5A is a diagram illustrating an example of a color image chart. The color image chart 500 includes an intermediate tone image area 501. The intermediate tone image area 501 indicates a region in which an image for which the entire area is represented by an intermediate tone of the same signal value is formed and is composed of, for example, 50% halftone.

A test chart 502 illustrated in FIG. 5B is a diagram illustrating an example of a blank chart. The blank chart 502 includes a non-image area 503. The non-image area 503 indicates a region in which an image is not formed.

In the intermediate tone image area 501 of the color image chart 500, image defects such as those in which the intermediate tone density decreased or a white dropout occurred and image defects such as those in which the intermediate tone density increased can be inspected. Further, in the non-image area 503 of the blank chart 502, image defects such as those in which a formed image increases in density rather than being white can be inspected.

Figure 6A:
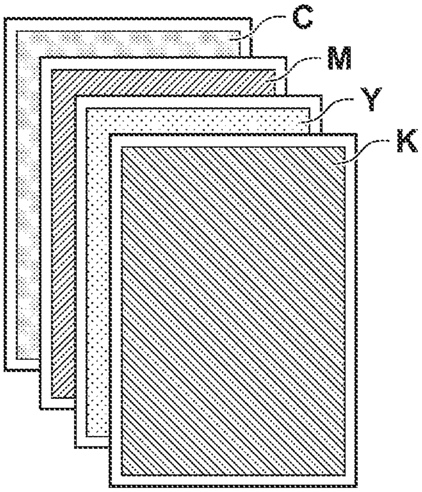
FIGS. 6A to 6C are diagrams illustrating an example of a test chart set to be used in image diagnosis according to the first embodiment.
Figure 6B:
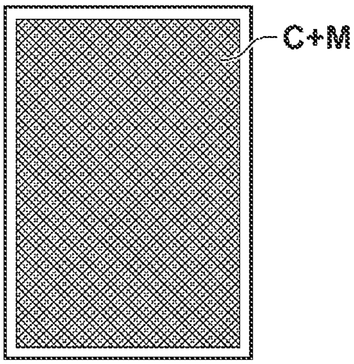
Figure 6C:
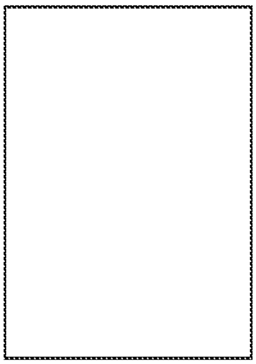

FIGS. 6A to 6C are diagrams illustrating an example of a test chart set to be used in image diagnosis according to the first embodiment.

FIG. 6A illustrates a set composed of a plurality of single-color charts. The single-color charts include intermediate tone image areas of yellow (Y), magenta (M), cyan (C), and black (K), which are process colors.

FIG. 6B illustrates a mixed-color chart (mixed-color image). The mixed-color chart includes an intermediate tone image area formed by intermediate tone multinary colors, which are secondary or higher-order colors. For example, the mixed-color chart is composed of a halftone image in which cyan is 50% and magenta is 50%. Here, the intermediate tone image area constituting the mixed-color chart of FIG. 6B is assumed to be composed of two colors, cyan and magenta, but is not limited thereto. FIG. 6C illustrates a blank chart. The blank chart includes a non-image area.

Figure 7:
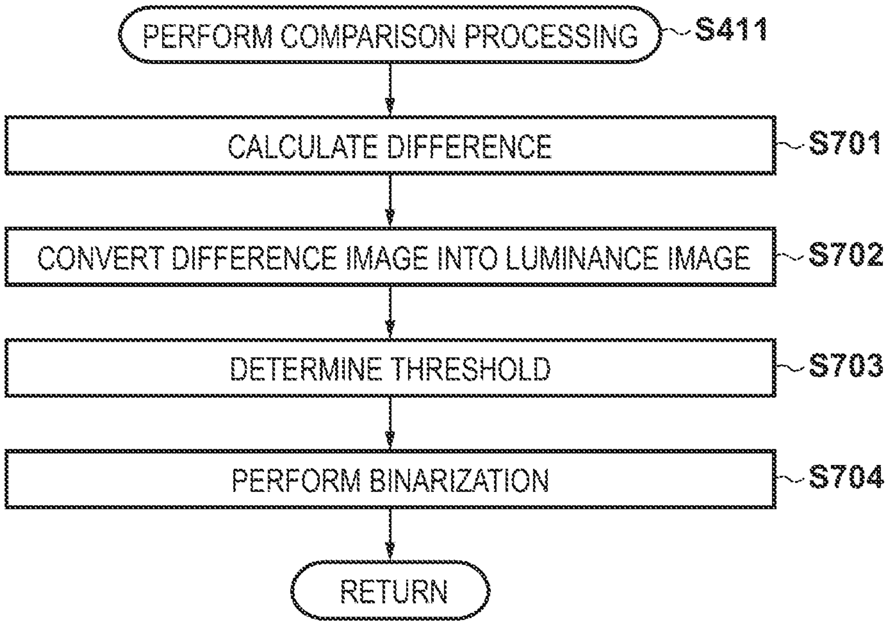
FIG. 7 is a flowchart for explaining a procedure of reference image and scanned image comparison processing to be performed in step S411 of FIG. 4 according to the first embodiment.

FIG. 7 is a flowchart for explaining a procedure of reference image and scanned image comparison processing to be performed in step S411 of FIG. 4 according to the first embodiment. The processing described in the flowchart is achieved by the CPU 214 of the inspection apparatus 109 executing a program deployed in the memory 215.

In step S701, the CPU 214 calculates a difference between the reference image and the scanned image. Here, regarding the difference calculation, the difference is calculated for each of the RGB channels of respective images. Next, the processing proceeds to step S702, and the CPU 214 converts the difference image obtained in step S701 into a luminance image. The conversion into a luminance image is achieved, for example, by converting RGB channel signal values of each pixel of the difference image using the following equation.

$$\text{Luminance} = 0.299 \times R + 0.587 \times G + 0.114 \times B$$

Then, the processing proceeds to step S703, and the CPU 214 determines a threshold for binarizing the luminance image. Here, regarding the threshold, a pre-stored threshold may be read out or the threshold may be determined dynamically from the luminance values of the luminance image. Then, the processing proceeds to step S704, and the CPU 214 binarizes the luminance image based on the threshold determined in step S703.

With the binarization processing, a portion that is "1" and a portion that is "0" are determined to be, for example, an image defect portion and a normal portion, respectively.

Figure 8:
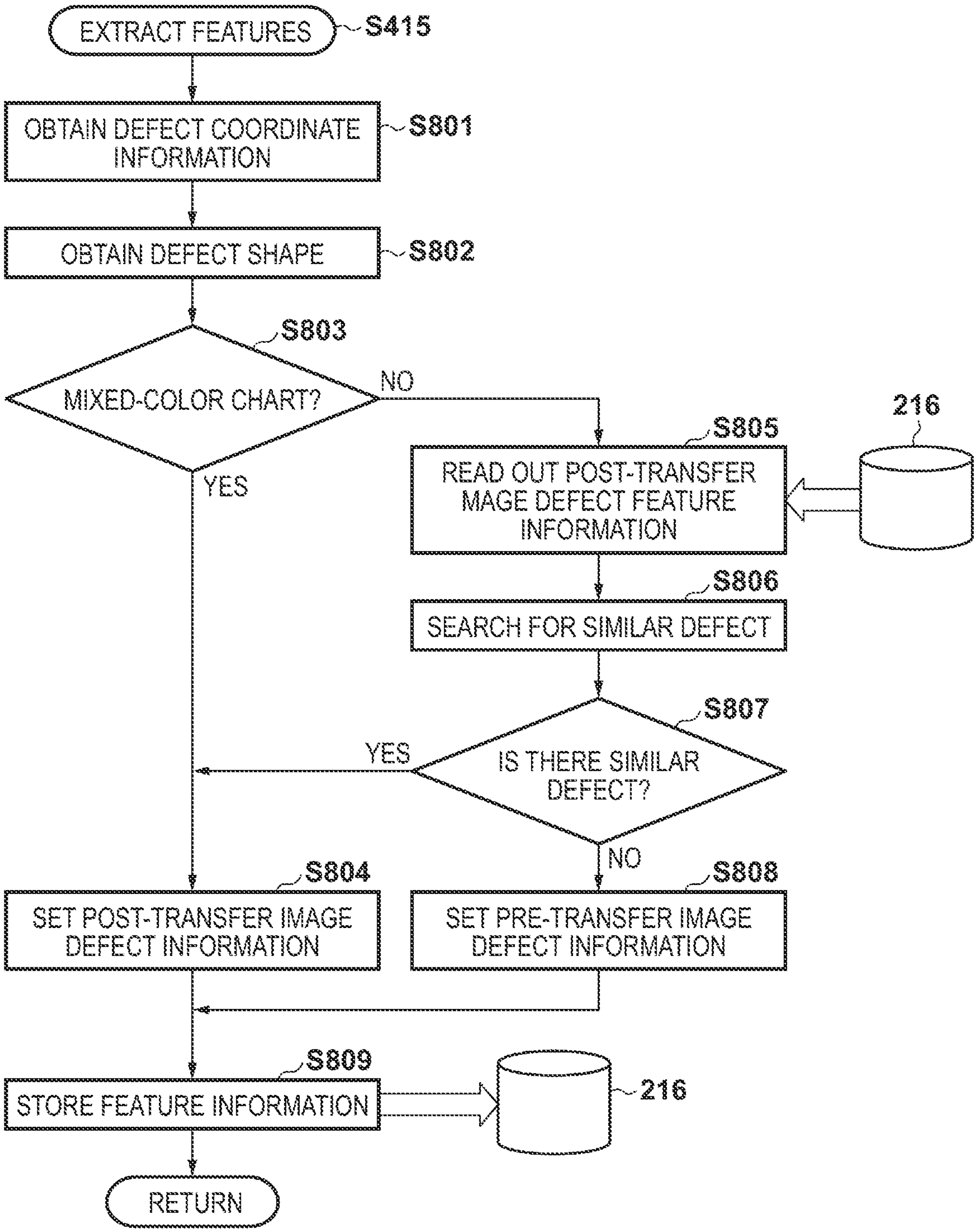
FIG. 8 is a flowchart for explaining a procedure of processing for determining whether or not the cause of an image defect is before transfer in feature extraction processing of step S415 of FIG. 4 according to the first embodiment.

FIG. 8 is a flowchart for explaining a procedure of processing for determining whether or not the cause of an image defect is before transfer in feature extraction processing of step S415 of FIG. 4 according to the first embodiment. Here, before the transfer refers to a process until transfer of toner images onto the intermediate transfer belt 308 in a superimposed manner. Specifically, it refers to a process of forming a toner image on the photosensitive drum of the image forming stations 304 to 307 and a process until transfer of the toner image of any one of the process colors constituting the mixed-color chart onto the intermediate transfer belt 308.

In step S801, the CPU 214 obtains information on coordinates at which the image defect is occurring from the image defect data obtained in step S414. Next, the processing proceeds to step S802, and the CPU 214 obtains information indicating the shape of the image defect from the image defect data. Then, the processing proceeds to step S803, and the CPU 214 determines whether or not the test chart being used is a mixed-color chart. If the mixed-color chart is being used here, the processing proceeds to step S804, feature information indicating that the image defect is a defect that occurred after the transfer is set, and the processing proceeds to step S809. In this case, in step S809 the CPU 214 stores the feature information (post-transfer defect information) set in step S804 in the HDD 216 and ends the processing. With the feature information, it is possible to narrow down to and identify the location of a failure in the printing apparatus that caused the occurrence of the image defect.

Here, in the case of a mixed-color chart, an image defect is detected by conversion of the difference image into a luminance image (step S702) and binarization of the luminance values of the luminance image (step S704) as illustrated in the flowchart of FIG. 7. Therefore, an image defect in which only one of the colors of a cyan and magenta mixed-color chart is missing will be black when binarized and thus will be not be detected as an image defect. Therefore, image defects detected in the mixed-color chart will be those detected in both of the colors in the cyan and magenta mixed-color chart. Namely, the image defect occurs after the transfer.

Figure 9A:
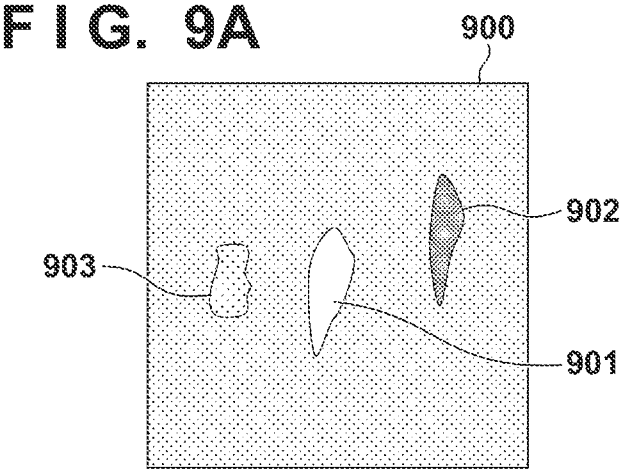
FIGS. 9A and 9B are schematic diagrams illustrating examples of an image defect that occurred in a mixed-color chart and a binarized image thereof.
Figure 9B:
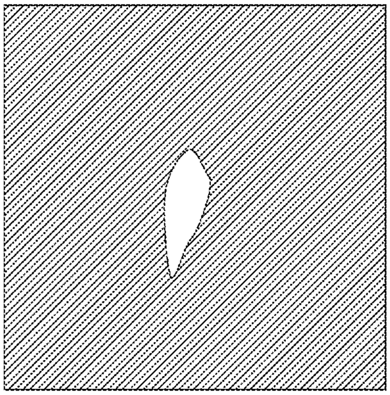

FIGS. 9A and 9B are schematic diagrams illustrating examples of an image defect that occurred in a mixed-color chart and a binarized image thereof.

FIG. 9A is a diagram illustrating an example in which image defects are occurring in a scanned image of a mixed-color chart. An intermediate tone image area 900 is formed by a first process color and a second process color. Here, a description will be given assuming that the first process color is cyan and the second process color is magenta.

An image defect 901 represents a post-transfer image defect because both cyan and magenta toners are missing. Since both cyan and magenta toners are thus missing, the post-transfer image defect 901 appears as a white image defect. Image defects 902 and 903 represent pre-transfer image defects that occurred in cyan and magenta, respectively. The cyan pre-transfer image defect 902 appears as a magenta image defect because cyan toner is missing. Similarly, the magenta pre-transfer image defect 903 appears as a cyan image defect because magenta toner is missing.

FIG. 9B illustrates the binarized image of FIG. 9A. With binarization processing, the pre-transfer image defects 902 and 903 are both converted into black pixels, and only the post-transfer image defect 901 is converted into white pixels. Thus, only the post-transfer image defect 901 can be detected.

Next, a description of FIG. 8 will be returned to again, and if it is determined in step S803 that the mixed-color chart is not being used, the processing proceeds to step S805, and the CPU 214 reads out the post-transfer image defect feature information from the HDD 216. Then, the processing proceeds to step S806, and the CPU 214 performs a similar image defect search as to whether there is a similar image defect in the image defect feature information read out in step S805. Regarding the similar image defect search, a search is performed based on, for example, the degree of similarity of shapes of image defects. A known template matching technique can be used to determine the degree of similarity of shapes. Then, the processing proceeds to step S807, and the CPU 214 determines the presence or absence of a similar image defect and, if it is determined that there is a similar image defect, the processing proceeds to step S804 and sets feature information that the image defect is a defect that occurred after the transfer. Meanwhile, when it is determined in step S807 that there is no similar image defect, the processing proceeds to step S808. In step S808, the CPU 214 sets feature information that the image defect is an image defect that occurred before the transfer and the processing proceeds to step S809. In this case, in step S809 the CPU 214 stores the feature information (pre-transfer image defect information) set in step S808 in the HDD 216 and ends the processing.

With the above-described processing, it is possible to accurately determine whether a part that is the cause of an image defect is before or after the transfer based on the feature information of the detected image defect information. By then identifying the part that is the cause of occurrence of the image defect and determining a response to the image defect, it is possible to implement an appropriate response measure for the image defect.

Variation of First Embodiment

In the above-described first embodiment, the presence or absence of an image defect is determined from a difference image obtained by comparison of a reference image and a scanned image. However, the presence or absence of an image defect may be determined using only a scanned image. For example, a reference signal value may be determined from a scanned image, and the presence or absence of an image defect may be determined based on a difference image obtained from calculation of a difference between the reference signal value and the scanned image. Here, the reference signal value can be determined by using, for example, a median of signal values of the entire area of the scanned image.

As described above, according to the first embodiment, by executing image diagnosis using a test chart that includes a mixed-color chart, it is possible to separate whether the cause of occurrence of an image defect is before or after transfer. Thus, it is possible to accurately identify a part that is the cause of occurrence of the image defect.

Second Embodiment

In the above-described first embodiment, a method of determining whether or not the cause of occurrence of an image defect is before transfer using single-color charts of respective process colors and a mixed-color chart has been described.

In contrast to this, in a second embodiment, an example in which determination as to whether or not the cause of occurrence of an image defect is before transfer without using single-color charts and using only a mixed-color chart in which a plurality of colors are mixed will be described. By performing image diagnosis only with a mixed-color chart, a reduction of the number of test charts to be printed in image diagnosis can be expected. Since the configuration of the printing system according to the second embodiment is similar to that of the above-described first embodiment, the description thereof will be omitted.

Figure 10:
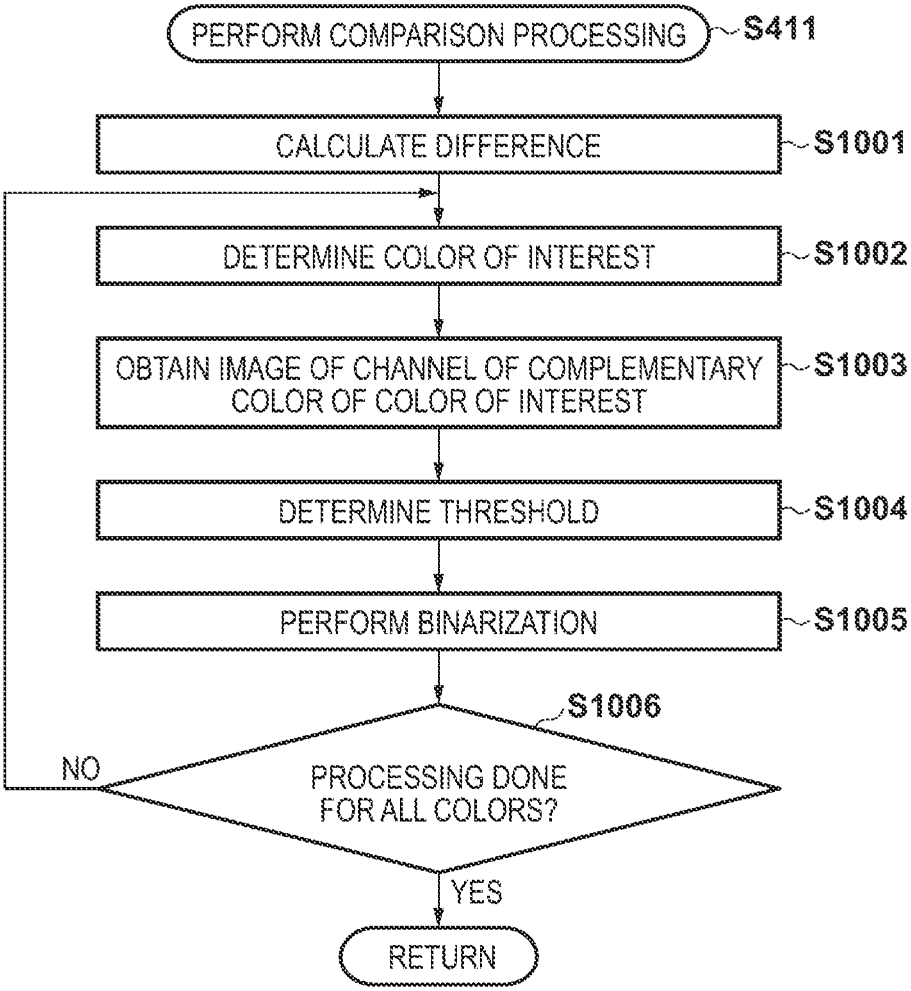
FIG. 10 is a flowchart for explaining a procedure of reference image and scanned image comparison processing to be performed in step S411 of FIG. 4 by the inspection apparatus according to a second embodiment of the present invention.

FIG. 10 is a flowchart for explaining a procedure of the comparison processing to be performed in step S411 of FIG. 4 by the inspection apparatus 109 according to the second embodiment of the present invention.

In step S1001, the CPU 214 of the inspection apparatus 109 calculates a difference between the reference image and the scanned image. Here, regarding the difference calculation, the difference is calculated for each of the RGB channels of respective images. Next, the processing proceeds to step S1002, and the CPU 214 determines a color of interest. The color of interest is selected from the process colors constituting multinary colors included in the test chart printed in step S404 of FIG. 4. Then, the processing proceeds to step S1003, and the CPU 214 obtains an image of a channel of a complementary color of the color of interest determined in step S1002 from the difference image. Then, the processing proceeds to step S1004, and the CPU 214 determines a threshold for binarizing the complementary color channel image obtained in step S1003. Here, regarding the threshold, a pre-stored threshold may be read out or the threshold may be determined dynamically from the luminance values of the luminance image.

Figure 11A:
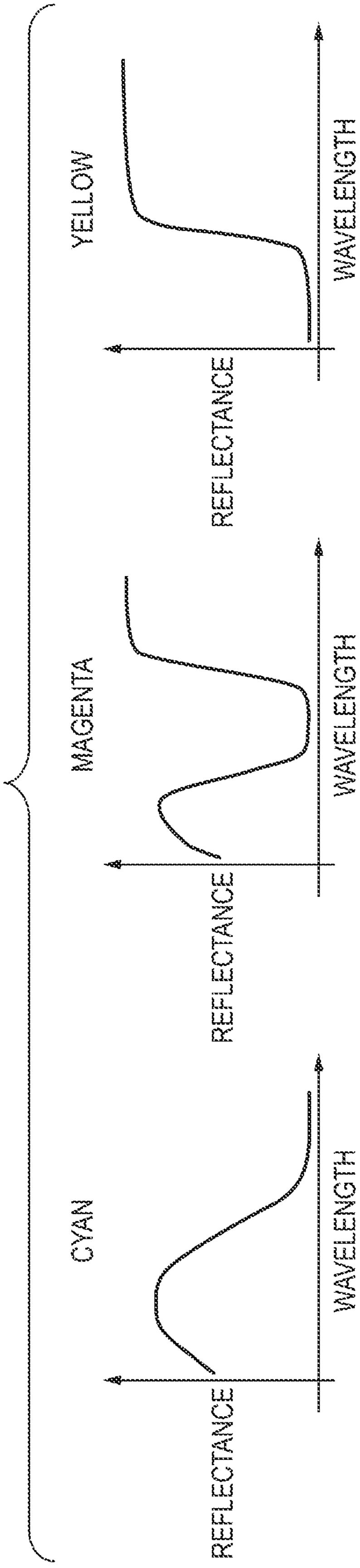
FIGS. 11A and 11B are schematic diagrams illustrating process color separation in which complementary color channels are used according to the second embodiment.
Figure 11B:
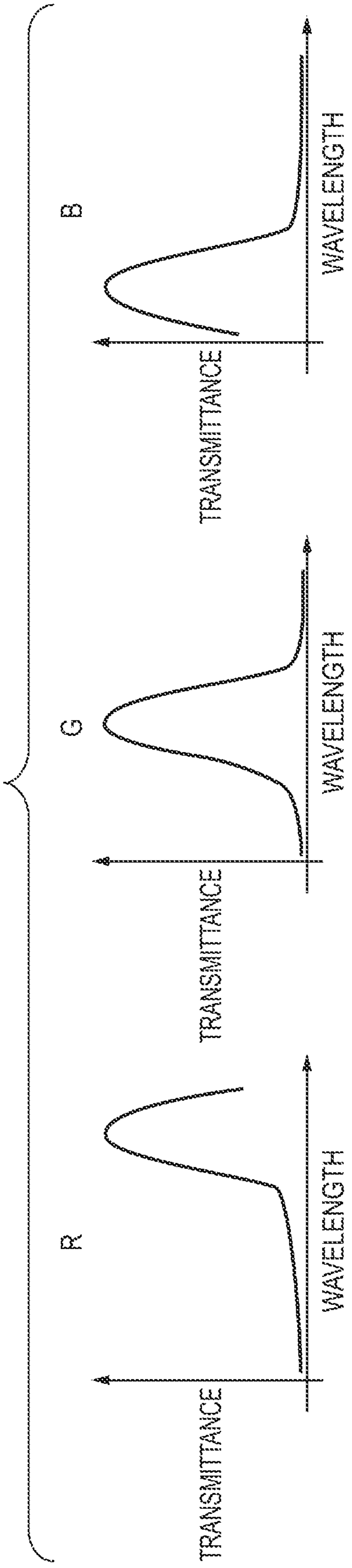

FIGS. 11A and 11B are schematic diagrams illustrating process color separation in which complementary color channels are used.

FIG. 11A is a diagram illustrating reflectances of toners of process colors, cyan, magenta, and yellow. Hereafter, for convenience, a short wavelength portion of visible light will be referred to as a blue (B) wavelength portion, a medium wavelength portion will be referred to as a green (G) wavelength portion, and a long wavelength portion will be referred to as a red (R) wavelength portion, as shown in FIG. 11B.

The cyan toner reflects light of the B and G wavelength portions and absorbs light of the R wavelength portion. The magenta toner reflects light of the B and R wavelength portions and absorbs light of the G wavelength portion. The yellow toner reflects light of the G and R wavelength portions and absorbs light of the B wavelength portion.

FIG. 11B is a diagram illustrating a transmittance of RGB filters used in the image readers 331 and 332. In the image readers 331 and 332, light transmitted through the respective R, G, and B filters are read as respective R, G, and B channel pixel values.

If a cyan toner image is formed on a recording material by the image forming apparatus 101, the cyan toner absorbs light of the R wavelength portion, and so, light transmitted through the R filter will be reduced. Similarly, if a magenta toner image is formed, light transmitted through the G filter will be reduced, and if a yellow toner image is formed, light transmitted through the B filter will be reduced. This is the relationship between cyan, magenta, and yellow toners and the complementary RGB channel colors.

Therefore, by focusing on RGB channel pixel values that are of complementary colors of the colors cyan, magenta, and yellow respectively, the process colors can be separated.

Next, the processing proceeds to step S1005, and the CPU 214 binarizes the image of the channel of the complementary color of the color of interest based on the threshold determined in step S1004. With the binarization processing, a portion that is "1" and a portion that is "0" are determined to be, for example, an image defect portion and a normal portion, respectively. Then, the processing proceeds to step S1006, and the CPU 214 determines whether the above-described processing has been performed for all the process colors constituting the multinary colors used in the test chart. If there is an unprocessed color, the processing transitions to step S1002, and the CPU 214 determines a color of interest from among the unprocessed colors. If processing has thus been performed for all the process colors in step S1006, the comparison processing flow will end.

With the processing, an image defect that occurred in each color of interest can be detected.

Figure 12:
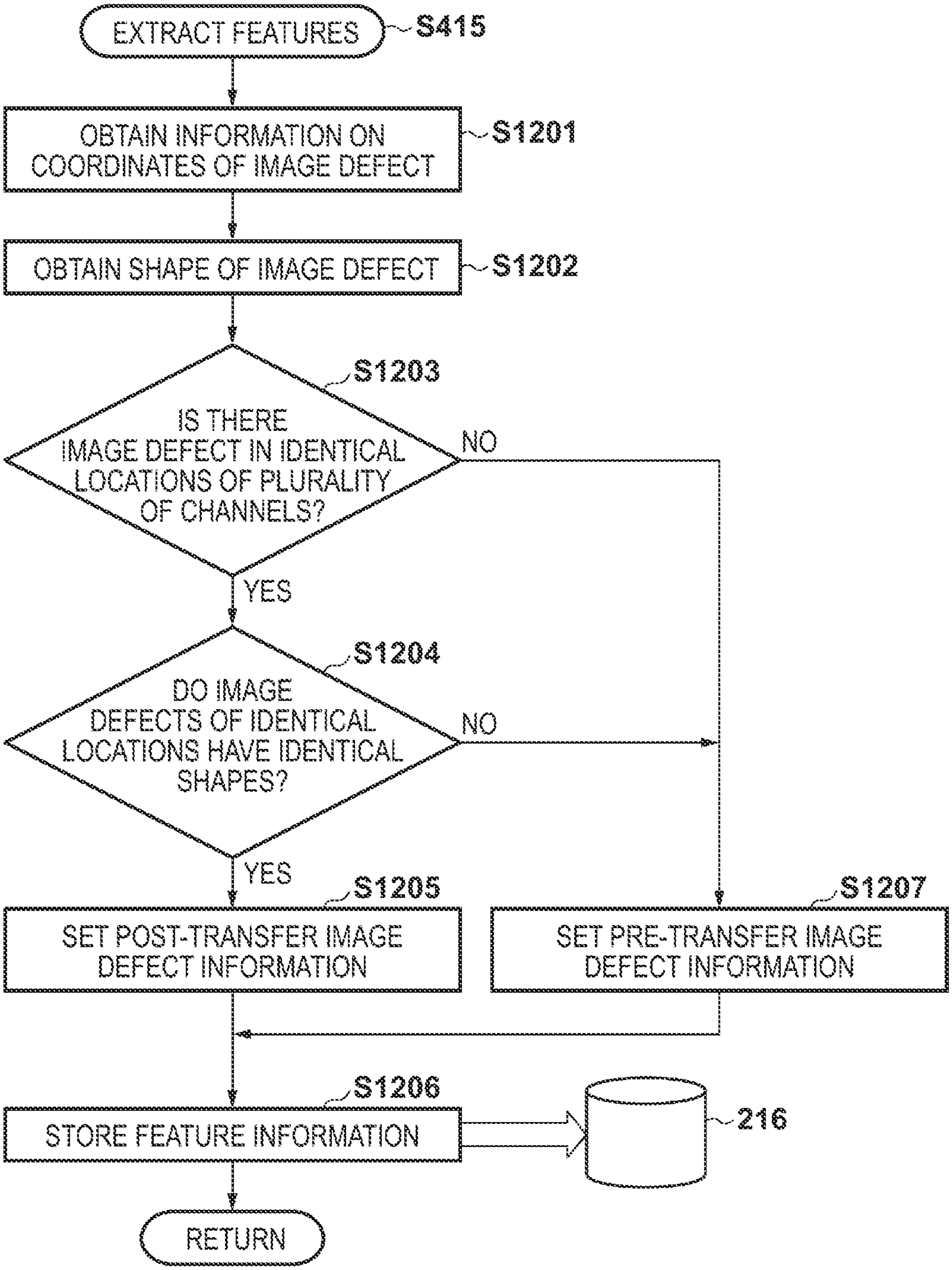
FIG. 12 is a flowchart for explaining processing for the inspection apparatus according to the second embodiment to determine whether or not the cause of an image defect is before transfer in image defect feature extraction processing of step S415 of FIG. 4.

FIG. 12 is a flowchart for explaining processing for the inspection apparatus 109 according to the second embodiment to determine whether or not the cause of an image defect is before the transfer in image defect feature extraction processing of step S415 of FIG. 4.

In step S1201, the CPU 214 obtains information on coordinates of the image defect from the image defect data. Next, the processing proceeds to step S1202, and the CPU 214 obtains information on the shape of the image defect from the image defect data. Next, the processing proceeds to step S1203, and the CPU 214 determines whether there are image defects at identical locations of a plurality of channels of the image defect data. If it is determined that there are image defects at identical locations of the plurality of channels, the processing transitions to step S1204, and the CPU 214 determines whether the image defects at identical locations are of identical shapes. If it is determined here that the image defects are of identical shapes, the processing proceeds to step S1205, and the CPU 214 sets feature information that the image defect is an image defect that occurred after the transfer and the processing proceeds to step S1206.

Meanwhile, if it is determined in step S1203 that there are no image defects at identical locations of the plurality of channels or if it is determined in step S1204 that the image defects at identical locations are not of identical shapes, the processing proceeds to step S1207. In step S1207, the CPU 214 sets feature information that the image defect is an image defect that occurred before the transfer and the processing proceeds to step S1206. When any of the processes of the above-described step S1205 and step S1207 is thus completed, the processing proceeds to step S1206, and the CPU 214 stores the image defect feature information in the HDD 216 and ends the processing.

With the above-described processing, by using the mixed-color chart, it is possible to identify the part that is the cause of occurrence of an image defect based on the feature information of the detected image defect information and determine a response to the image defect. By thus accurately determining whether the part that is the cause of the image defect is before or after the transfer, it is possible to implement an appropriate response measure against the image defect.

FIGS. 13A to 13F are schematic diagrams illustrating processing for determining whether or not the cause of an image defect is before the transfer based on a mixed-color chart according to the second embodiment.

Figure 13A:
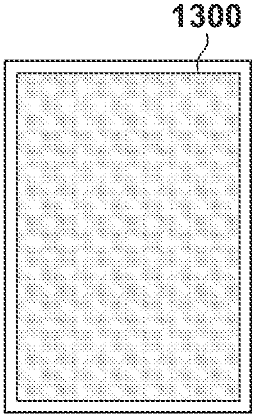
FIGS. 13A to 13F are schematic diagrams illustrating processing for determining whether or not the cause of an image defect is before transfer based on a mixed-color chart according to the second embodiment.

FIG. 13A illustrates an example of test chart data. An image area 1300 is composed of an intermediate tone of multinary colors, which are secondary or higher-order colors. Hereafter, description will be given assuming that the image area is composed of a secondary color of cyan (C) and yellow (Y).

Figure 13B:
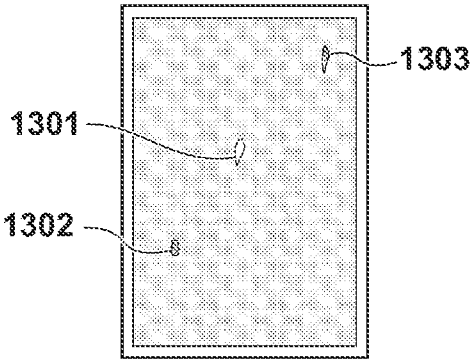

FIG. 13B illustrates scanned image data for which the test chart of FIG. 13A has been printed and scanned. Image defects 1301 to 1303 are occurring in the scanned image data of FIG. 13B. Here, an image defect 1301 indicates a post-transfer image defect. Image defects 1302 and 1303 indicate pre-transfer image defects occurring in cyan and yellow, respectively.

Figure 13C:
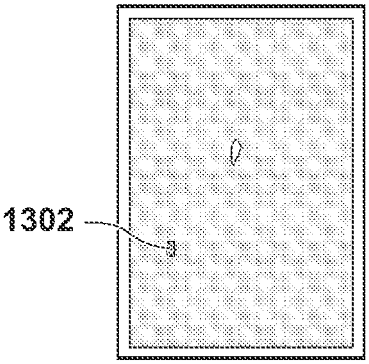
Figure 13D:
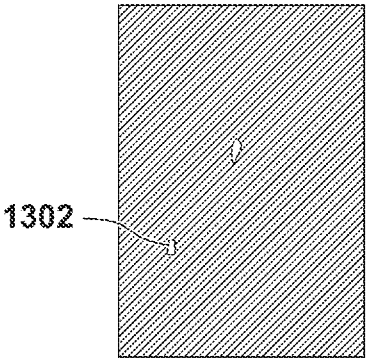

FIG. 13C illustrates a red channel image of the scanned image data of FIG. 13B. Red is a complementary color of cyan, and by using the red channel image, it is possible to detect an image defect 1302 occurring in cyan. FIG. 13D is image defect data obtained by comparison of the red channel image of FIG. 13C and a red channel of a reference image.

Figure 13E:
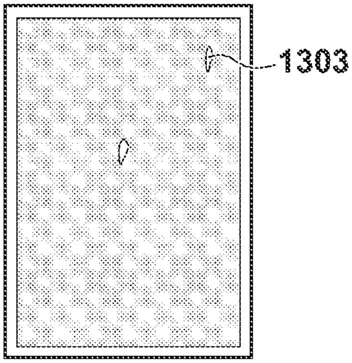
Figure 13F:
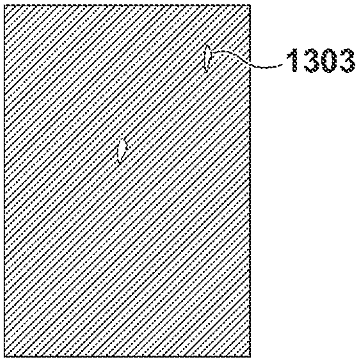

FIG. 13E illustrates a blue channel image of the scanned image data of FIG. 13B. Blue is a complementary color of yellow, and by using the blue channel image, it is possible to detect an image defect 1303 occurring in yellow. FIG. 13F is image defect data obtained by comparison of the blue channel image of FIG. 13E and a blue channel of a reference image.

By analyzing the image defect data of FIGS. 13D and 13F, it is possible to determine that the image defect 1301 occurring at identical positions in both as a post-transfer image defect, the image defect 1302 occurring only in FIG. 13D as a pre-transfer image defect that occurred in cyan, and the image defect 1303 occurring only in FIG. 13F as a pre-transfer image defect that occurred in yellow.

Variation of Second Embodiment

In the above-described second embodiment, the comparison processing and the image defect cause determination processing are performed using complementary RGB color channels (complementary color channels). However, the processes may be performed after conversion into a color space, such as L*C*h* or XYZ, for example. The processing in which an L*C*h* color space is used will be described below. Here, L indicates a lightness index, C indicates chroma, and h indicates a hue angle.

FIGS. 14A to 14D are schematic diagrams illustrating processing for determining the cause of an image defect, using an L*C*h* channel, according to a variation of the second embodiment.

Figure 14A:
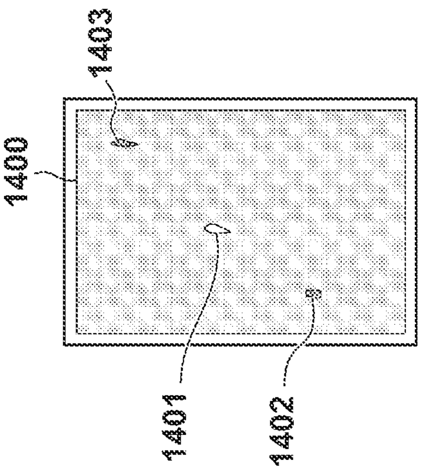
FIGS. 14A to 14D are schematic diagrams illustrating processing for determining the cause of an image defect, using an L*C*h* channel, according to a variation of the second embodiment.
Figure 14B:
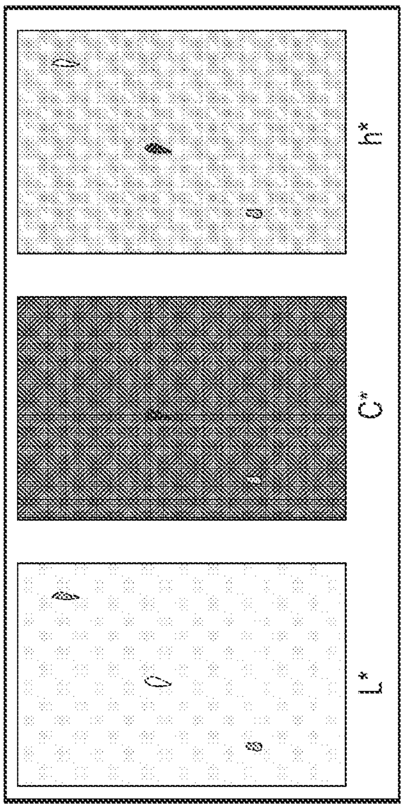

FIG. 14A illustrates a scanned image for which a mixed-color test chart has been scanned. An image area 1400 is an image area on which an intermediate tone halftone image of a mixed-color is formed. Hereafter, a description will be given assuming that the image area 1400 is formed by a secondary color of cyan (C) and yellow (Y). Here, an image defect 1401 represents a post-transfer image defect. Image defects 1402 and 1403 represent pre-transfer image defects occurring in cyan and yellow, respectively. FIG. 14B illustrates images obtained by converting the scanned image of FIG. 14A into L*C*h* channels. For the sake of simplicity, only the area in the image area of the scanned image is illustrated here.

Figure 14C:
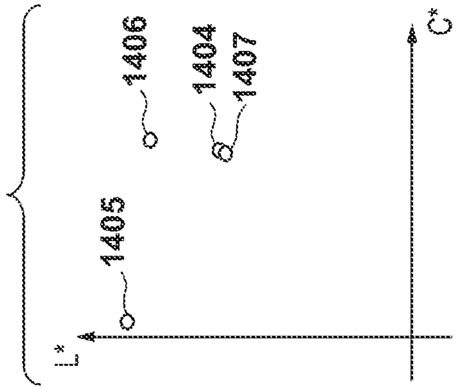
Figure 14D:
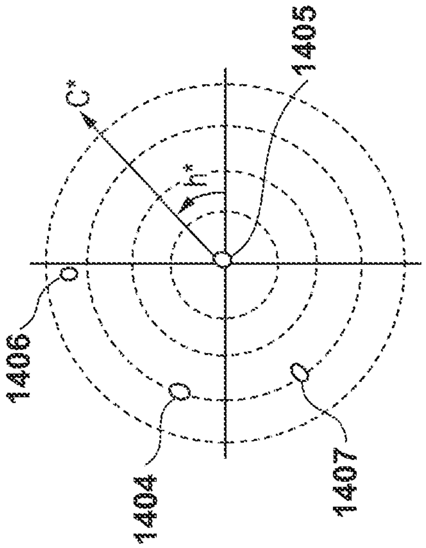

FIG. 14C is a schematic diagram in which a pixel value distribution of pixels included in an image defect is plotted on an L*C* (lightness component and chroma component) plane. FIG. 14D is a schematic diagram in which a pixel value distribution is plotted on a C*h* plane. Reference numerals 1404 to 1407 respectively indicate pixel value groups for which similar colors among the plotted pixel values have been grouped.

The reference numeral 1404 denotes a group of pixel values of a mixed-color area (non-image defect area) of the image area 1400, the reference numeral 1405 denotes those of the post-transfer image defect 1401, the reference numeral 1406 denotes those of the pre-transfer image defect 1402, and the reference numeral 1407 denotes those of the pre-transfer image defect 1403. If there is no image defect in the scanned image, a pixel value group will only be the group 1404 of pixel values of a mixed-color area, and so, the presence or absence of an image defect can be determined from the number of pixel values groups.

The post-transfer image defect 1401 appears as a blank area because both cyan and yellow toners are missing. That is, the pixel value group 1405 has low chroma and high lightness, and, thus, by focusing on the L*C* channel, it is possible to determine a post-transfer image defect.

Since cyan and yellow toners are missing, the pre-transfer image defects 1402 and 1403 each appears as the other toner image. Therefore, the pixel values of the image defect area changes in hue with respect to the mixed-color area. Since the cyan pre-transfer image defect 1402 appears as a yellow image defect, the pixel value group 1406 is lesser in h* than the pixel value group 1404 of the mixed-color area. Similarly, since the yellow pre-transfer image defect 1403 appears as a cyan image defect, the pixel value group 1407 is greater in h* than the pixel value group 1404 of the mixed-color area. As described above, by focusing on the C*h* channel, it is possible to determine a pre-transfer image defect.

As described above, according to the second embodiment, by performing image comparison processing and image defect feature extraction processing in which signal values of a plurality of channels are used, it is possible to distinguish whether or not the cause of occurrence of an image defect is before or after transfer in a simple manner, using only a mixed-color chart. Thus, it is possible to accurately identify a part that is the cause of occurrence of the image defect. By performing image diagnosis only with a mixed-color chart, reduction of the number of test charts to be printed in image diagnosis can be expected.

OTHER EMBODIMENTS

Embodiments of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or an apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus comprising:

one or more controllers including one or more processors and one or more memories, the one or more controllers configured:

to obtain a scanned image by scanning an image of a chart on which a test image of mixed colors, which are a secondary color or higher-order colors, has been printed;

to detect an image defect corresponding to each color included in the scanned image;

to obtain a feature of the detected image defect; and to identify a cause of an occurrence of the image defect based on the feature, wherein, in the detecting of the image defect, the one or more controllers are further configured:

to obtain a difference image between the scanned image and a predetermined reference;

to convert the difference image into a luminance image; and to detect the image defect by binarizing the luminance image with respect to a threshold, and wherein, in the obtaining of the feature of the detected image defect, in a case when there are identical image defects in image defects corresponding to all of process colors included in the mixed colors of the test image, the one or more controllers obtain the feature indicating that the image defects have occurred after transfer in a printing apparatus that printed the test image.

2. The image processing apparatus according to claim 1, wherein, in the detection, the one or more controllers detect the image defect by comparing an image of a channel of a complementary color of each process color included in the mixed colors of the test image and a reference image.

3. The image processing apparatus according to claim 1, wherein the identical image defects are image defects that are at identical positions and are of identical shapes.

4. The image processing apparatus according to claim 1, wherein, in the obtainment of the feature of the detected image defect, in a case when there is not an identical image defect for all process colors included in the mixed colors of the test image, the one or more controllers obtain the feature indicating that the image defect has occurred before transfer in a printing apparatus that printed the test image.

5. The image processing apparatus according to claim 1, wherein, in the obtainment of the feature of the detected image defect, the one or more controllers obtain the feature based on a lightness component and a chroma component of a pixel value group for which similar colors of pixel values included in the image defect have been grouped.

6. The image processing apparatus according to claim 1, wherein, in the obtainment of the feature of the detected image defect, the one or more controllers extract the feature, using an RGB channel of a complementary color of a process color included in the mixed colors of the printed test image.

7. The image processing apparatus according to claim 1, wherein the printed test image comprises an intermediate tone halftone image.

8. The image processing apparatus according to claim 1, wherein the cause of the occurrence includes an occurrence before transfer of the test image to the chart or an occurrence after transfer of the test image to the chart.

9. The image processing apparatus according to claim 1, wherein the image defect includes a dot or a streak-like image defect.

10. The image processing apparatus according to claim 1, wherein, in the detection, the one or more controllers obtain, from the scanned image a reference signal value that is a median of signal values of an entire scanned image and determine a presence or an absence of an image defect based on a difference image of the reference signal value and the scanned image.

11. The image processing apparatus according to claim 1, wherein the one or more controllers are further configured to display the cause of occurrence of the image defect.

12. A method of controlling an image processing apparatus, the method comprising:

obtaining a scanned image by scanning an image of a chart on which a test image of mixed colors, which are a secondary color or higher-order colors, has been printed;

detecting an image defect corresponding to each color included in the scanned image;

obtaining a feature of the detected image defect; and identifying a cause of an occurrence of the image defect, based on the feature, wherein the detecting of the image defect comprises:

obtaining a difference image between the scanned image and a predetermined reference;

converting the difference image into a luminance image; and detecting the image defect by binarizing the luminance image with respect to a threshold, and wherein the obtaining of the feature of the detected image defect comprising, when there are identical image defects in image defects corresponding to all of process colors included in the mixed colors of the test image, obtaining the feature indicating that the image defects have occurred after transfer in a printing apparatus that printed the test image.

13. A non-transitory computer-readable storage medium storing a program for causing a processor to execute a method of controlling an image processing apparatus, the method comprising:

obtaining a scanned image by scanning an image of a chart on which a test image of mixed colors, which are secondary color or higher-order colors, has been printed;

detecting an image defect included in the scanned image;

obtaining a feature of the detected image defect; and identifying a cause of an occurrence of the image defect based on the feature, wherein the detecting of the image defect comprises:

obtaining a difference image between the scanned image and a predetermined reference;

converting the difference image into a luminance image; and detecting the image defect by binarizing the luminance image with respect to a threshold, and wherein the obtaining of the feature of the detected image defect comprising, when there are identical image defects in image defects corresponding to all of process colors included in the mixed colors of the test image, obtaining the feature indicating that the image defects have occurred after transfer in a printing apparatus that printed the test image.

* * * * *